3,359,201
LECITHIN PRODUCT AND METHOD
Joseph Eichberg, 3726 Peachtree Road NE.,
Atlanta, Ga. 30319
No Drawing. Filed Aug. 13, 1962, Ser. No. 216,328
14 Claims. (Cl. 252—1)

This invention relates to a method for improving commercial lecithin such as the vegetable phosphatides (a mixture of lecithin, cephalin and inositol phosphatide) derived from soybeans, corn or other oil seeds and referred to in the trade as "lecithin." Commercial lecithin has an acid value of about 18 to 22 and contains a carrier of about 35% vegetable oil; this oil impairs the formation of water emulsions of this phosphatides or the ease of dispersion in water. Fluid commercial lecithin is usually made by adding 3% to 5% of fatty acid to the commercial oil-phosphatide material which increases the acid value to about 28 to 32 and as a result the fluid lecithin is even less emulsifiable or dispersible.

An object of this invention is to make a commercial lecithin product which will be more readily dispersible in water.

Another object of this invention is to make a commercial lecithin product which will possess improved stability in salt solutions compared with ordinary commercial lecithin.

A further object is to improve the fluidity of commercial lecithin without drastically increasing the acid value.

It has been known that hydroxylation of lecithin would improve the affinity for moisture and the ease of dispersion and emulsification. It has also been recognized that addition of acetic substances would cause lecithin emulsions to break and in general would make the lecithin more difficult to disperse and emulsify.

It is therefore unexpected that small percentages of acetic anhydride according to this invention can be used to prepare a commercial lecithin which disperses and emulsifies more readily and is even more stable than untreated commercial lecithin in the presence of salt solutions.

Acetic anhydride has been used in the treatment of crude soybean oil to produce a "nonbreak" oil. The oil treated is substantially dry and contains only a small percentage, about 2% to 3% of phosphatides, and it was found that the lecithin recovered from this treated oil, according to the prior art, is the same as conventional soybean lecithin.

In the present invention, it is not desired to treat the oil but instead to treat the lecithin directly with acetic anhydride and when this is done an improved lecithin is obtained which is not similar to the conventional lecithins recovered by ordinary water or steam degumming of crude oils.

The acetic anhydride treatment disclosed herein is even effective with commercial lecithin made fluid by addition of fatty acids.

(1) Portions of commercial lecithin emulsion from the degumming of crude soybean oil, sometimes called wet gums or lecithin hydrate and containing about 35% water, were treated with 1%, with 2% and with 3% of acetic anhydride and the materials were then dried under vacuum for several hours at a temperature of about 160° F. to a moisture content of about 1%. The treated lecithin possessed improved water dispersibility.

(2) Lecithin hydrate in the form of water-containing commercial lecithin emulsion was heated with 2% acetic anhydride and sufficient sodium hydroxide was added to give a pH of about 7 in the finished dried lecithin. It was found that the neutralization did not interfere with dispersibility or with the stability in salt water.

(3) Commercial fluid soybean lecithin containing about 1% moisture was reacted with 1% of acetic anhydride for two hours at 60° C. The composition was neutralized by addition of 5% isopropanolamine.

(4) Commercial lecithin emulsion containing up to 50% moisture is treated with up to 4% acetic anhydride and is then dried to less than 0.4% moisture to yield a soft to fluid consistency material without added fatty acids and with good dispersibility in water.

(5) Commercial lecithin emulsion is treated in the same manner as in example No. 4 and to the dried product is added a fatty oil sufficient to adjust the acetone insoluble content to about 62%.

(6) Acetic anhydride treated commercial lecithin was reacted with sufficient alkali to neutralize any residual odor; it was found that this did not materially alter the consistency whereas with conventional fluid lecithin the addition of alkali causes a marked change in consistency.

(7) To commercial soybean lecithin containing about 1% moisture was added 2% acetic anhydride with mixing; water was introduced to form a lecithin hydrate and when a good emulsion had been formed and well mixed the moisture was removed under vacuum at a temperature below 200° F. The water may, alternatively be added to the lecithin first, followed by the acetic anhydride and vacuum drying.

(8) Commercial soybean lecithin emulsion as received from the centrifuges in the degumming of soybean oil was subjected to vacuum and heat to reduce the moisture content to about 5% to 10% at which point 2% of acetic anhydride was added and mixed whereupon the vacuum drying was continued to a moisture content of about 1% or less.

The amount of acetic anhydride may vary from as low as ½% up to 5% or slightly more on the weight of the phosphatides. For reasons of stability and consistency it is advisable to reduce the moisture content of the lecithin to about 1% and to below 0.4% for an even smoother and more fluid consistency.

The above description and examples of my invention are illustrative of the broader aspects of the invention and are not to be taken as limiting the invention as set forth in the following claims.

I claim:
1. A lecithin preparation having improved dispersibility, consisting essentially of about 1% moisture and up to about 40% of fatty oil, said preparation being the vacuum dried reaction product of aqueous oil-containing lecithin emulsion containing up to about 50% by weight of water with from about 0.5% to about 5% by weight of acetic anhydride.

2. A lecithin preparation according to claim 1 which has been neutralized with a member selected from the group consisting of sodium hydroxide and isopropanolamine, having a pH of about 7.

3. A lecithin preparation having improved dispersibility, consisting essentially of about 1% moisture and the balance of the vacuum dried reaction product of substantially dry lecithin with from about 0.5% to about 5% by weight of acetic anhydride.

4. The process for improving the dispersibility of lecithin containing up to about 40% by weight of fatty oils, comprising the steps of admixing with an emulsion of said lecithin and oil containing up to about 50% by weight of water between about 0.5% and about 5% of acetic anhydride and then drying the mixture under vacuum.

5. The process of claim 4 in which the drying is carried out at a temperature not in excess of about 200° F.

6. The process of claim 4 in which the treated mixture is neutralized with a member selected from the group consisting of sodium hydroxide and isopropanolamine to a pH of about 7.

7. The process of claim 4 in which the starting material is commercial lecithin having an acid value between about 18 and 22 containing about 35% vegetable oil.

8. The process of claim 4 in which the starting material is fluid commercial lecithin having an acid value between about 28 and 32 and containing about 35% vegetable oil including from about 3% to 5% of fatty acid.

9. The method of claim 4 in which the treated lecithin is dried to a moisture content of not more than about 0.4%.

10. The method of claim 9 in which there is further added a sufficient amount of a fatty oil to adjust the acetone-insoluble content to about 62.0%.

11. The method of claim 4 in which the acetic anhydride reacted emulsion is neutralized and then is dried under vacuum.

12. The method of improving the dispersibility of lecithin comprising reacting dried lecithin containing about 1% moisture with about 0.5% to 5% by weight of acetic anhydride.

13. The method of claim 12 in which the reacted product is neutralized with 5% by weight of isopropanolamine.

14. The method of claim 12 in which the reacted product is neutralized with an alkaline agent selected from the group consisting of sodium hydroxide and isopropanolamine.

References Cited

UNITED STATES PATENTS 3,301,881   1/1967   Davis _____ 260—403

OTHER REFERENCES

Wittcoff, The Phosphatides, pages 58, 59, 73 and 74 (1951 edition), A.C.S. Monograph Series, No. 112, Reinhold Pub. Corp., New York, N.Y.

CHARLES B. PARKER, *Primary Examiner.*

L. D. ROSDOL, D. D. HORWITZ, *Examiners.*

J. T. FEDIGAN, A. H. SUTTO, *Assistant Examiners.*